UNITED STATES PATENT OFFICE.

HERMANN WEYLAND, HANS HAHL, AND RUDOLF BERENDES, OF ELBERFELD, GERMANY, ASSIGNORS TO FARBENFABRIKEN VORM. FRIEDR. BAYER AND CO., OF LEVERKUSEN, NEAR COLOGNE, GERMANY.

PHARMACEUTICAL PRODUCT.

1,426,430.     Specification of Letters Patent.     Patented Aug. 22, 1922.

No Drawing.     Application filed August 8, 1921. Serial No. 490,699.

*To all whom it may concern:*

Be it known that we, HERMANN WEYLAND, HANS HAHL, and RUDOLF BERENDES, citizens of Germany, residing at Elberfeld, Germany, have invented new and useful Improvements in Pharmaceutical Products (for which we have filed applications in Germany, September 3, 1919; Austria, August 23, 1920; Czecho-Slovakia, December 6, 1920; Switzerland, August 21, 1920; and in Japan, March 16, 1921), of which the following is a specification.

We have found that a new product for therapeutic use, being a valuable remedy against scabies, is obtained by treating xylene with sulfur and aluminium chlorid.

In carrying out the invention practically we can proceed as follows, the parts being by weight:—75 parts of xylene, 25 parts of sulfur and 6 parts of aluminium chlorid are heated to boiling in a vessel provided with a reflux condenser until the evolution of $SH_2$ and HCl ceases. The oil is then poured into water, dried and distilled in vacuo. For further purification it can be shaken with alkali.

The new product is a dark yellow oil boiling at from 150 to 230° C. under a pressure of 3—3 mm.

We claim:—

The herein-described new pharmaceutical compound being a condensation product obtained from xylene, sulfur and aluminium chlorid; being a dark yellow oil boiling at from 150 to 230° C. under a pressure of 3-5 mm., and being a valuable remedy against scabies, substantially as described.

In testimony whereof we have hereunto set our hands in the presence of two subscribing witnesses.

HERMANN WEYLAND. [L. S.]
HANS HAHL. [L. S.]
RUDOLF BERENDES. [L. S.]

Witnesses:
WILH. KREIKENBOHM,
EDWARD SONNENBERG.